United States Patent
Kaneko et al.

(10) Patent No.: US 6,976,812 B2
(45) Date of Patent: Dec. 20, 2005

(54) SMALL DRILL

(75) Inventors: Kazuhiro Kaneko, Ibaraki-Ken (JP); Niro Odani, Ibaraki-Ken (JP)

(73) Assignee: Mitsubishi Materials Corporation, Tokyo (JP)

( * ) Notice: Subject to any disclaimer, the term of this patent is extended or adjusted under 35 U.S.C. 154(b) by 241 days.

(21) Appl. No.: 10/416,769

(22) PCT Filed: Mar. 30, 2001

(86) PCT No.: PCT/JP01/02708

§ 371 (c)(1),
(2), (4) Date: May 12, 2003

(87) PCT Pub. No.: WO02/40206

PCT Pub. Date: May 23, 2002

(65) Prior Publication Data

US 2004/0037662 A1 Feb. 26, 2004

(30) Foreign Application Priority Data

Nov. 14, 2000 (JP) .................................. 2000-346953

(51) Int. Cl.⁷ .............................................. B23B 51/02
(52) U.S. Cl. ..................... 408/199; 408/230; 408/705
(58) Field of Search ............................... 408/199, 223, 408/227, 229, 230, 705

(56) References Cited

U.S. PATENT DOCUMENTS

| 4,222,690 A | 9/1980 | Hosoi |
| 4,449,865 A | * 5/1984 | Yankovoy et al. .......... 408/1 R |
| 5,584,617 A | 12/1996 | Houser |

FOREIGN PATENT DOCUMENTS

| FR | 2552694 | * 4/1985 | ........... B23B/51/08 |
| JP | 60-23924 | 6/1985 | ........... B23B/51/02 |
| JP | 8-90323 | * 4/1996 | ........... B23B/51/00 |
| JP | 2002-28810 | * 1/2002 | ........... B23B/51/00 |
| JP | 2003-311522 | * 11/2003 | ........... B23B/51/00 |
| SU | 1103961 | * 7/1984 | ................. 408/227 |

OTHER PUBLICATIONS

Incomplete copy of Denmark patent 64715, published Aug. 16, 1946, copy in 408/199.*

Incomplete copy of either a German or Austrian patent 13815, published Mar. 6, 1897, copy in 408/199.*

* cited by examiner

Primary Examiner—Daniel W. Howell
(74) Attorney, Agent, or Firm—Darby & Darby

(57) ABSTRACT

A small drill includes one chip-discharging flute which is helically formed in the exterior surface of a cutting portion of the small drill. The small drill also includes a flute-shaped portion which is formed in the front region of the chip-discharging flute in the rotating direction, which is connected to the chip-discharging flute, and which is open at the exterior surface of the cutting portion. The core diameter ratio d/D, in percent, of the small drill is set to 60% or more, and a margin angle θ thereof is set to 120° or more.

4 Claims, 6 Drawing Sheets

SMALL DRILL

This application is a U.S. national phase application under 35 U.S.C. §371 of International patent application No. PCT/JP01/02708 filed Mar. 30, 2001, and claims the benefit of Japanese patent application No. 2000-346953 filed Nov. 14, 2000 both of which are incorporated by reference herein.

BACKGROUND OF THE INVENTION

1. Field of the Invention

The present invention relates to a cutting tool, such as a small drill, which is primarily used for forming deep, small-diameter holes in printed circuit boards.

The present application is based on Japanese patent application No. 2000-346953, the contents of which are incorporated by reference into this specification.

2. Background Art

Generally, small drills are expected to form holes having extremely small diameters. Typical small drills have a rod-shaped cutting portion having a small diameter of about 0.05 to 3.175 mm and a shank portion having a relatively large diameter which is connected to a rotating shaft of a machine tool. The cutting portion and the shank portion are integrally formed, or are connected to each other by soldering, by interference fit, etc. The cutting portion is usually constructed of a cemented carbide, and the shank portion is usually constructed of a cemented carbide, steel, etc.

In conventional small drills, two chip-discharging flutes are helically formed in the exterior surface of the cutting portion from the tip end toward the other end, in a rotationally symmetrical manner around the rotational axis. In such conventional small drills having two chip-discharging flutes, the core diameter thereof is reduced by having the two chip-discharging flutes, and the rigidity thereof is also reduced. Accordingly, when a deep, small-diameter hole, such as a hole having a diameter of 1 mm or less and a ratio of depth to diameter of 5 or more, is formed, the straightness of the formed hole in the depth direction is degraded. Thus, the accuracy of the hole position is reduced, and breakage of the cutting portion may occur. Although such problems may be solved by employing step feeding, the hole-forming speed will be extremely low, and productivity will be greatly degraded.

A small drill which is free from the above-described disadvantages is disclosed in U.S. Pat. No. 5,584,617. FIG. 9 is a side view of this small drill 10, and FIG. 10 is a sectional view of a cutting portion of the small drill 10. The small drill 10 includes a cutting portion 1 and a shank portion. As shown in FIG. 9, a chip-discharging flute 2 is helically formed in the cutting portion 1 around the rotational axis O. In addition, the helix angle "γ" of the chip-discharging flute 2 is continuously increased from the tip end of the cutting portion 1 toward the other end, so that chip dischargeability is improved. In addition, with reference to FIG. 10, a land 3, which is the peripheral surface of the cutting portion 1, includes a margin 4 and a body clearance 5 having a constant depth "a". The margin 4 is formed in the region directly behind the chip-discharging flute 2 in the rotating direction T of the small drill 10, and the body clearance 5 is formed in a region directly behind the margin 4. Since only one chip-discharging flute 2 is provided in the small drill 10, the core diameter is relatively large. Thus, the rigidity of the small drill 10 is ensured, and the above-described problems are solved to some extent.

In order to ensure the rigidity, however, only one chip-discharging flute 2 is formed in the small drill 10. Thus, space for discharging chips is reduced compared to the conventional small drill which has two chip-discharging flutes. Accordingly, chip dischargeability is degraded, so that the chips may clump together inside the flute and failure to discharge the chips may occur.

In addition, the depth "a" of the body clearance 5, which is formed behind the margin 4 in the rotating direction T, is relatively small. Accordingly, the space inside the body clearance 5 is not sufficient for discharging the chips, so the body clearance 5 does not serve to discharge the chips.

As a result, when a hole having an extremely small diameter, such as 0.5 mm or less, and an extremely large ratio of diameter to depth, such as 10 or more, is formed, failure to discharge the chips may frequently occur. Accordingly, the small drill 10 cannot satisfy an increasing demand to form smaller and deeper holes.

SUMMARY OF THE INVENTION

In consideration of the above-described situation, an object of the present invention is to provide a small drill for forming deep, small-diameter holes which has sufficient rigidity and chip dischargeability, and which is able to form holes with high positional accuracy.

To this end, a small drill of the present invention, which is used for drilling a deep, small-diameter hole having a diameter of 1 mm or less and a ratio of depth to diameter of 5 or more, includes one chip-discharging flute which is helically formed at the exterior surface of a cutting portion of the small drill around the rotational axis from the tip end toward the other end, and a flute-shaped portion which is formed in the front region of the chip-discharging flute in the rotating direction, which is connected to the chip-discharging flute, which is open at the exterior surface of the cutting portion, and which has a sufficient space for discharging chips which are produced during a cutting process of a work material.

Since only one chip-discharging flute is formed in the cutting portion of the small drill, the core diameter is larger compared to the conventional small drill, in which two chip-discharging flutes are formed. Accordingly, the rigidity of the small drill is ensured, and holes may be formed with stable positional accuracy. In addition, the flute-shaped portion, which is formed in the front region of the chip-discharging flute in the rotating direction, has sufficient space for discharging chips. Thus, the produced chips may be discharged not only through the chip-discharging flute but also through the flute-shaped portion. Accordingly, chip dischargeability is improved, and clumping of the chips and the breakage of the small drill may be prevented.

The ratio, in percent, of a maximum depth of the flute-shaped portion M to the maximum outer diameter D, that is, M/D, is preferably 10% or more. When this ratio, M/D, in percent, is smaller than 10%, chip dischargeability will be degraded.

In addition, the ratio, in percent, of the diameter "d" of the largest circle which is inscribed in a cross section of the cutting portion to the outer diameter D of the cutting portion, that is, d/D (hereinafter referred to as "core diameter ratio"), is preferably 60% or more.

When such a construction is applied, the core diameter of the small drill is increased, so that the rigidity thereof is ensured. In contrast, when the core diameter ratio d/D, in percent, is less than 60%, the core diameter will be reduced, and sufficient rigidity may not be obtained.

In a cross section of a part of the cutting portion in which a margin is formed, an angle between a line which passes through an end of the margin and the rotational axis and a line which passes through the other end of the margin and the rotational axis is preferably 120° or more. This angle will be referred to as a "margin angle" in the following description.

During the cutting process, the margin contacts the inner wall of the hole which is being formed, and serves to remove the produced burrs. In addition, the margin also serves to counterbalance a force applied to a cutting edge in the radial direction, and to improve the ability of the small drill to advance straightly by guiding the cutting portion thereof. When the margin angle is smaller than 120°, the ability of the small drill to advance straightly will be degraded, so that sufficient positional accuracy may not be obtained.

DETAILED DESCRIPTION OF THE PREFERRED EMBODIMENTS

Embodiments of the present invention will be described below with reference to the accompanying drawings.

Figure 1:
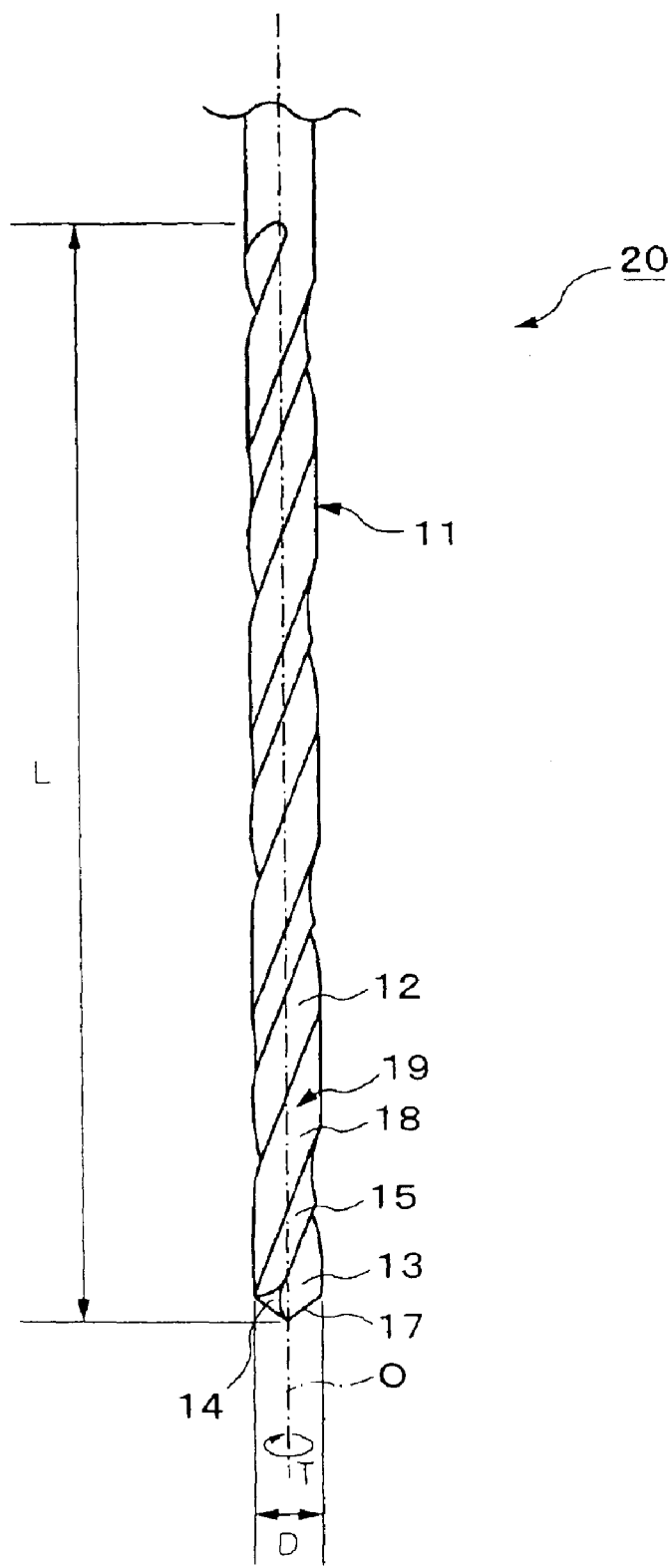
FIG. 1 is a side view of a small drill according to a first embodiment of the present invention.
Figure 2:
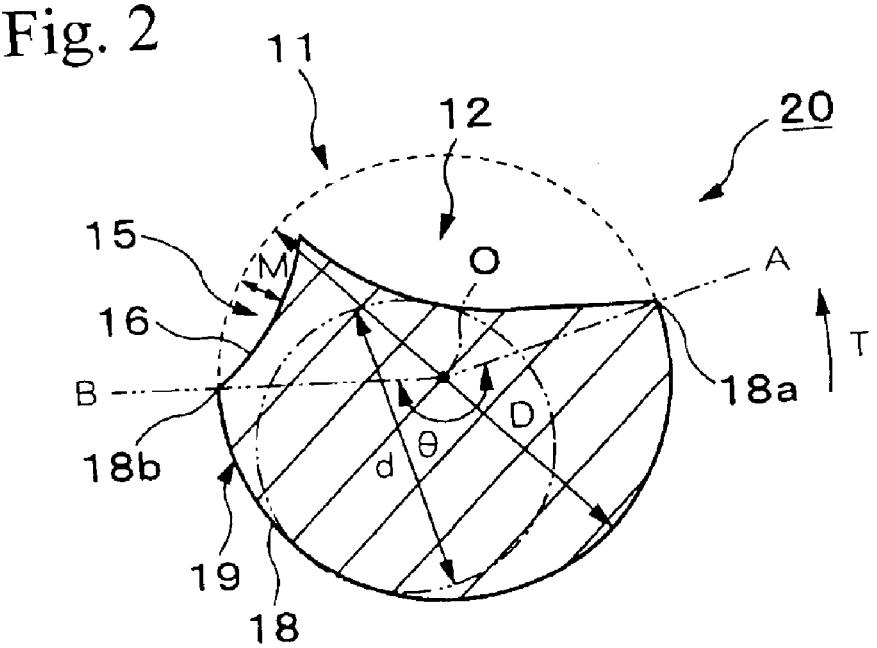
FIG. 2 is a sectional view of a cutting portion of the small drill shown in FIG. 1.

FIG. 1 is a side view of a small drill according to a first embodiment of the present invention, and FIG. 2 is a sectional view of a cutting portion of the small drill shown in FIG. 1.

The small drill 20 according to the first embodiment of the present invention includes a cutting portion 11 and a shank portion. As shown in FIG. 1, the cutting portion 11 has an approximately columnar shape, and has a small diameter about 0.05 to 1 mm. In addition, the cutting portion 11 is of a straight type, in which the outer diameter D does not change from the tip end to the other end. Thus, the outer diameter D of the cutting portion 11 is the same as the maximum outer diameter D.

A chip-discharging flute 12 is helically formed in the exterior surface of the cutting portion 11 around the rotational axis O from the tip end toward the other end.

In addition, a flute-shaped portion 15 is also helically formed in the exterior surface of the cutting portion 11 around the rotational axis O from the tip end toward the other end. As shown in FIG. 2, the flute-shaped portion 15 has an inner wall 16 which, in sectional view, has the shape of an arc concave toward the rotational axis O. The flute-shaped portion 15 is formed at the front region of the chip-discharging flute 12 in the rotating direction T, in a manner such that the rear part of the inner wall 16 in the rotating direction T is connected to the chip-discharging flute 12.

The maximum depth M of the flute-shaped portion 15 is determined by the maximum distance between the inner wall 16 of the flute-shaped portion 15 and the peripheral circle of the cutting portion 11 on a line which perpendicularly intersects the rotational axis O. The ratio of the maximum depth M to the maximum outside diameter D, that is, M/D, in percent, is preferably 10% or more. When the ratio M/D, in percent, is less than 10%, chip dischargeability will be degraded.

A rake face 13 is a part of the inner surface of the chip-discharging flute 12 which faces the rotating direction T at the tip end of the cutting portion 11. A cutting edge 17 is formed along a ridge line between the rake face 13 and a flank face 14 which is formed at the tip end of the cutting portion 11. In addition, the cutting portion 11 is constructed so that the maximum outside diameter D thereof is 1 mm or less, and so that the ratio of the effective cutting length L thereof to the maximum outside diameter D, that is, L/D, is 5 or more. In the first embodiment, the maximum outside diameter D is determined by the diameter of a circle centered on the rotational axis O, and which includes an arc formed by a margin 18, which will be described below.

In the cutting portion 11, a land 19, which is the external surface excluding the chip-discharging flute 12 and the flute-shaped portion 15, is formed as the margin 18. Similar to the chip-discharging flute 12 and the flute-shaped portion 15, the margin 18 is also helically formed in the direction opposite to the rotating direction T from the tip end toward the other end. In the first embodiment, the margin 18 is formed over the entire region of the cutting portion 11.

With reference to FIG. 2, the front end of the margin 18 in the rotating direction T is designated by 18a, and the other end of the margin 18 which is at the rear in the rotating direction T is designated by 18b. In the first embodiment, the end 18a is formed along the ridge line between the chip-discharging flute 12 and the margin 18, and the end 18b is formed along the ridge line between the flute-shaped portion 15 and the margin 18. A margin angle θ, which is the angle between line OA, which passes through the end 18a and the rotational axis O, and line OB, which passes through the end 18b and the rotational axis O, is set to 120° or more. In the first embodiment, the margin angle θ is set to 200°.

With reference to FIG. 2, the ratio of the diameter "d" (referred to as the "core diameter") of the largest circle which is inscribed in the cross section of the cutting portion 11 to the maximum outside diameter D of the cutting portion 11, which is a core diameter ratio d/D, in percent, is set to 60% or more. As shown in FIG. 2, in the first embodiment, the diameter of the largest circle which internally contacts the margin 18 and the chip-discharging flute 12 is the core diameter "d", and the core diameter ratio d/D, in percent, is set to, for example, 65%. In addition, in the first embodiment, the core diameter ratio d/D is set to a constant value over the entire region of the cutting portion 11.

Figure 3:
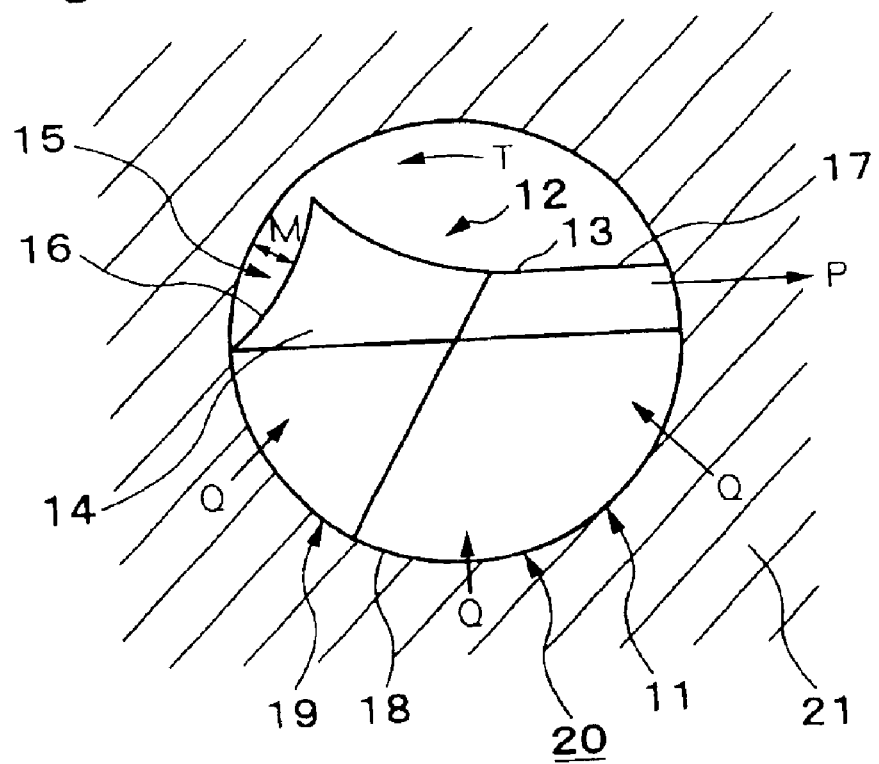
FIG. 3 is an end view of the small drill according to the first embodiment of the present invention, showing a manner in which the small drill cuts a work material.

An operation of forming a hole in a work material 21 such as a printed circuit board, etc., by the small drill 20 of the first embodiment will be described below. FIG. 3 is an end view of the cutting portion 11 of the small drill 20 according to the first embodiment.

As shown in FIG. 3, the cutting edge 17 cuts the work material 21 while the small drill 20 rotates in the rotating direction T. Chips which are produced during the cutting process move along the inside surface of the chip-discharging flute 12 from the tip end toward the other end, and are discharged outside the hole which is being formed. Since the flute-shaped portion 15 is formed so that there is enough space to receive chips, the produced chips move not only inside the chip-discharging flute 12 but also inside the flute-shaped portion 15 from the tip end toward the other end, and are discharged outside the hole. Meanwhile, the small drill 20 moves along the rotational axis O and penetrates into the work material 21, and the margin 18 at the exterior surface of the cutting portion 11 performs surface finishing such as deburring, etc., of the inner wall of the hole while guiding the drill in the hole.

As described above, in the small drill 20 according to the first embodiment, only one chip-discharging flute 12 is formed in the exterior of the cutting portion 11, and the core diameter ratio d/D, in percent, is 60% or more. Thus, the core diameter of the cutting portion 11 is not reduced, so that the rigidity of the small drill 20 is ensured. Accordingly, the positional accuracy of the formed hole is not degraded, and breakage of the small drill 20 does not occur.

Moreover, since the flute-shaped portion 15 is formed in the exterior of the cutting portion 11, not only the chip-discharging flute 12 but also the flute-shaped portion 15 serve to discharge the chips therethrough, so that clumping of the chips may be prevented. Accordingly, chip dischargeability is improved compared to the conventional small drill having only one chip-discharging flute.

During the cutting process, the margin 18 contacts the inner wall of the hole which is being formed and removes any burrs which are produced. In addition, the margin 18 also serves to guide the cutting portion 11 and to improve the ability of the small drill to advance straightly. Since the margin angle θ is set to 120° or more, the ability of the small drill to advance straightly is ensured, and the positional accuracy of the formed hole is improved.

When the margin angle θ is smaller than 120°, the ability to guide the small drill is degraded, and the rotation of the small drill around the rotational axis O is unbalanced. Thus, the ability of the small drill to advance straightly is degraded, and the positional accuracy of the formed hole is reduced. Preferably, the margin angle θ is as large as possible.

As shown in FIG. 3, the cutting edge 17 receives a force P, which is directed in the radial direction from the rotational axis O so as to pull the cutting edge 17 outward, while it cuts the work material 21 during the cutting process. On the other hand, the margin 18 receives stresses Q in the directions toward the rotational axis O from the inner wall of the hole which is being formed. When the margin angle θ is set to 120° or more (for example, 200°), as in the first embodiment, the stresses Q applied to the margin 18 are increased. The stresses Q serve to counterbalance the force P which is applied to the cutting edge 17 so as to pull the cutting edge 17. Accordingly, bending of the drill is prevented and the ability of the small drill to advance straightly is ensured, so that the positional accuracy of the formed hole is further increased.

Figure 4:
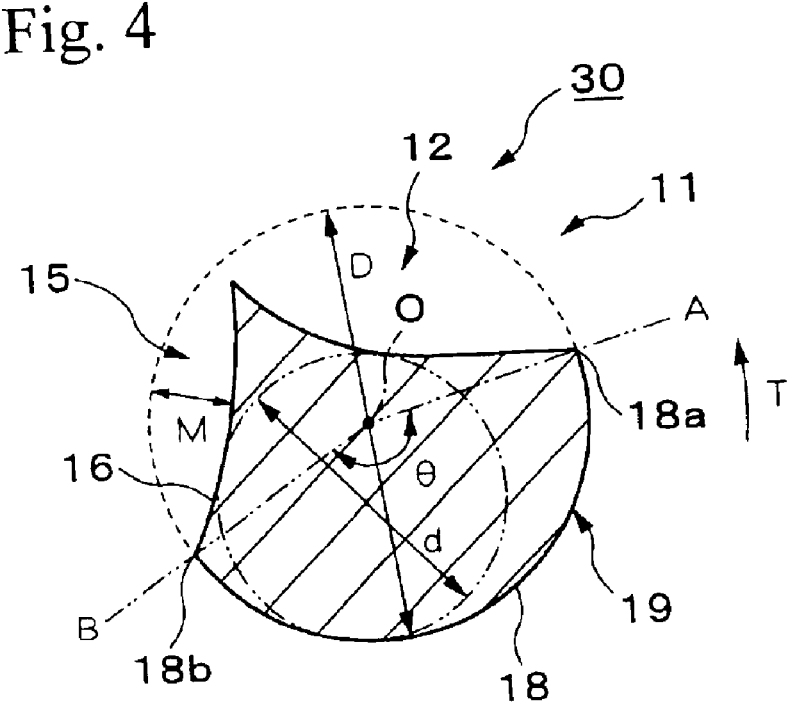
FIG. 4 is a sectional view of a cutting portion of a small drill according to a second embodiment of the present invention.
Figure 5:
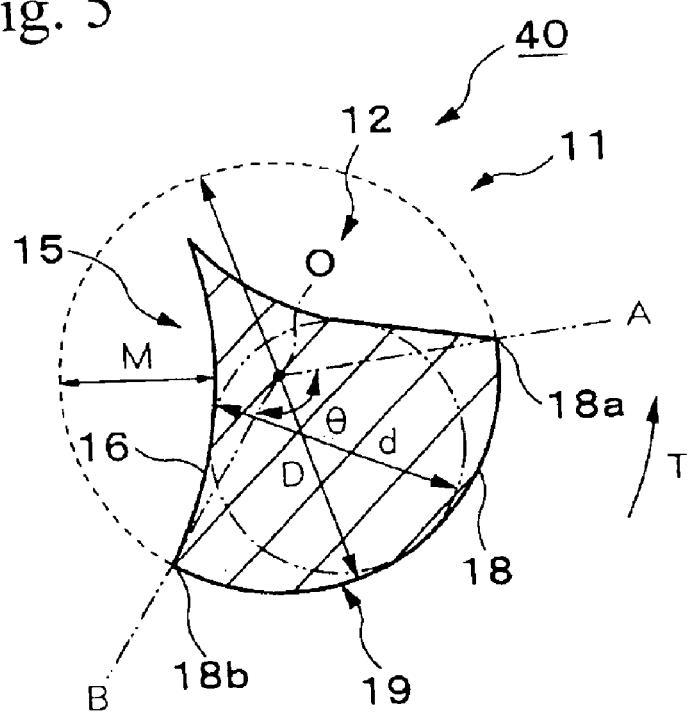
FIG. 5 is a sectional view of a cutting portion of a small drill according to a third embodiment of the present invention.

FIG. 4 is a sectional view of a cutting portion of a small drill according to a second embodiment of the present invention, and FIG. 5 is a sectional view of a cutting portion of a small drill according to a third embodiment of the present invention.

The small drills 30 and 40 of the second and the third embodiments, have almost the same construction as the small drill 20 of the first embodiment, except that the margin angles θ and the core diameter ratios d/D are different. Thus, parts corresponding to those in the first embodiment are denoted by the same reference symbols, and redundant explanations are omitted.

As shown in FIG. 4, the margin angle θ of the small drill 30 according to the second embodiment is set to, for example, 170°, and the core diameter ratio d/D, in percent, thereof is set to, for example, 65%. In the second embodiment, the largest circle which internally contacts the margin 18, the chip-discharging flute 12, and the flute-shaped portion 15 has the diameter "d".

In the second embodiment, since the margin angle θ is set to a lower value compared to the first embodiment, the space inside the flute-shaped portion 15 is increased compared to the first embodiment. In addition, although the core diameter ratio d/D is set to the same value as the first embodiment, the cross section of the cutting portion 11 is reduced since the area of the flute-shaped portion 15 is increased.

Thus, the area of the margin 18, which contacts the inner wall of the hole, and the cross section of the cutting portion 11 are reduced compared to the first embodiment. Accordingly, the ability of the small drill to advance straightly is degraded, and the rigidity of the small drill is reduced by some amount; however, the space inside the flute-shaped portion 15 is increased, so that chip dischargeability is improved.

In addition, as shown in FIG. 5, the margin angle θ of the small drill 40 according to the third embodiment is set to, for example, 120°, and the core diameter ratio d/D thereof, in percent, is set to, for example, 60%. In the third embodiment, the largest circle which internally contacts the margin 18, the chip-discharging flute 12, and the flute-shaped portion 15 has the diameter "d".

In the third embodiment, since the margin angle θ is set to a lower value compared to both the first and the second embodiments, the space inside the flute-shaped portion 15 is increased. In addition, the core diameter ratio d/D is set to a lower value compared to both the first and the second embodiment.

Thus, the area of the margin 18 and the cross section of the cutting portion 11 are further reduced compared to both the first and the second embodiments. Accordingly, the ability of the small drill to advance straightly is further degraded, and the rigidity of the small drill is further reduced to some extent; however, the space inside the flute-shaped portion 15 is further increased, so that chip dischargeability is further improved.

As described above, when the margin angle θ is increased, the area of the margin 18 which contacts the inner wall of the hole is also increased, so that the ability of the small drill to advance straightly becomes more stable. However, the space inside the flute-shaped portion 15 is reduced in accordance with the increase of the margin angle θ, so that chip dischargeability will be degraded. In addition, although the rigidity of the drill may be increased by increasing the core diameter ratio d/D, the spaces inside the chip-discharging flute 12 and inside the flute-shaped portion 15 is reduced in accordance with the increase of the core diameter ratio d/D. Thus, chip dischargeability is also degraded.

Taking such relationships into account, the margin angle θ, the core diameter ratio d/D, and the spaces inside the chip-discharging flute 12 and inside the flute-shaped portion 15 are adequately determined within respective ranges specified by the present invention in accordance with the work material, cutting conditions, etc. Accordingly, a small drill having desired characteristics may be obtained.

The land 19 may be provided with a body clearance having a predetermined depth for reducing the friction between the land 19 and the inner wall of the hole in the work material. Small drills having such a construction will be described below in fourth and fifth embodiments of the present invention.

Figure 6:
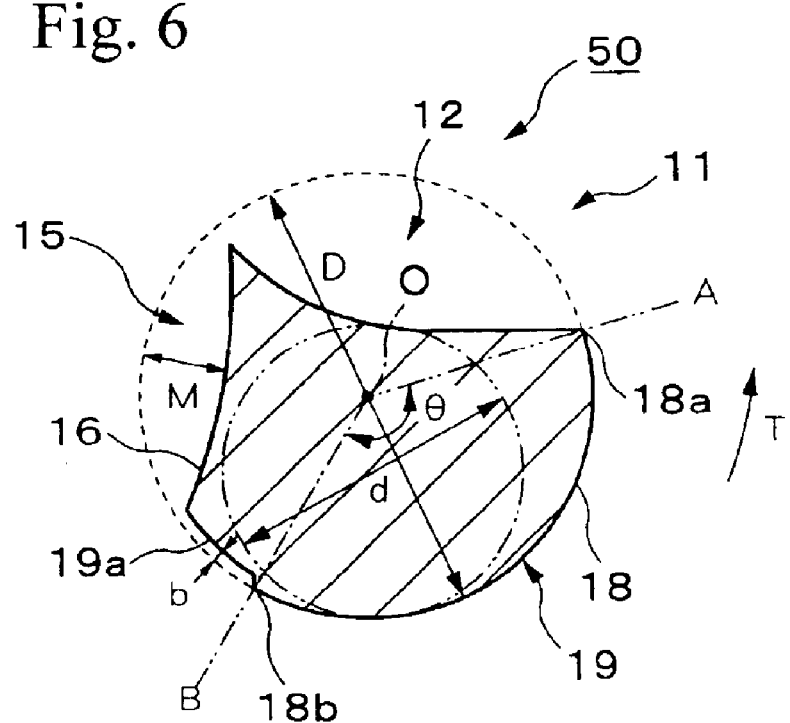
FIG. 6 is a sectional view of a cutting portion of a small drill according to a fourth embodiment of the present invention.
Figure 7:
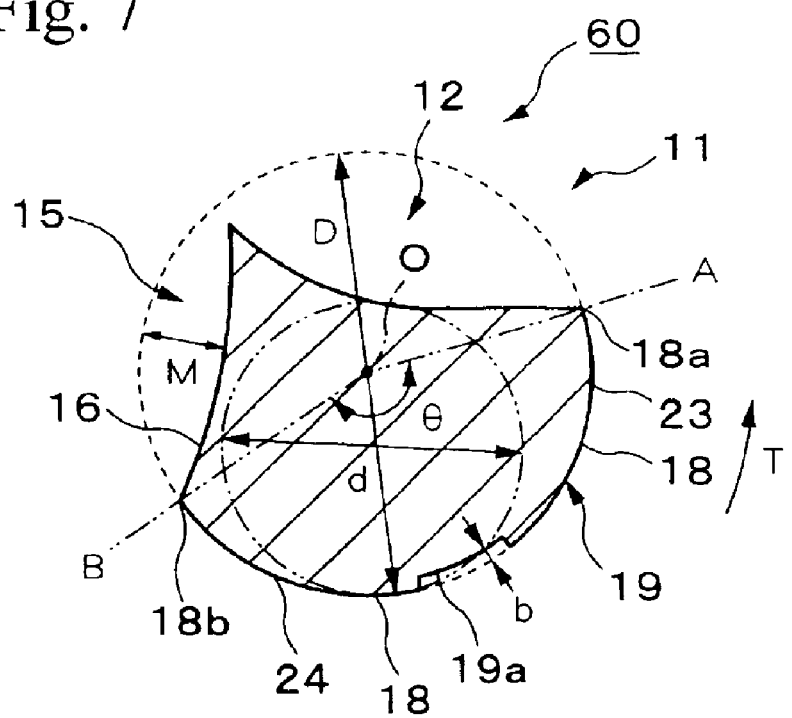
FIG. 7 is a sectional view of a cutting portion of a small drill according to a fifth embodiment of the present invention.

Small drills 50 and 60 according to the fourth and the fifth embodiments have almost the same construction as the small drill 20 of the first embodiment. Thus, parts corresponding to those in the first embodiment are denoted by the same reference symbols, and redundant explanations are omitted. FIG. 6 is a sectional view of a cutting portion of the small drill according to the fourth embodiment, and FIG. 7 is a sectional view of a cutting portion of the small drill according to the fifth embodiment.

As shown in FIG. 6, in the small drill 50 according to the fourth embodiment, the land 19, which is the external surface excluding the chip-discharging flute 12 and the flute-shaped portion 15, includes the margin 18 and a body clearance 19a. Similar to the chip-discharging flute 12, the body clearance 19a is helically formed in the direction opposite to the rotating direction T from the tip end toward the other end. The margin 18 is formed in the region directly behind the chip-discharging flute 12 in the rotating direction T, and the body clearance 19a is formed in a region directly behind the margin 18. In addition, the depth "b" of the body clearance 19a is constant.

The margin angle θ is set to, for example, 150°, and the core diameter ratio d/D, in percent, is set to, for example, 65%.

Due to the body clearance 19a, which is formed with the constant depth "b" for reducing the friction between the land 19 and the inner wall of the hole as described above, the contact area between the margin 18 and the inner wall of the formed hole is reduced; however, since the depth b of the body clearance 19a is small, the reduction in cross sectional area of the cutting portion 11 is also small. Thus, the rigidity of the small drill is still ensured.

The effects obtained by the first to the third embodiments may also be obtained by the small drill 50 having the above-described construction. The small drill 50 is especially suitable for a case in which it is not effective to increase the area of the margin 18, for example, in a case of forming a hole in a work material which causes relatively high cutting force.

In the above-described fourth embodiment, the body clearance 19a is formed in the rear region of the land 19 (i.e., directly behind the margin 18) in the rotating direction T. The body clearance 19a, however, may also be formed in the midsection of the land 19, so as to separate the margin 18 into two parts. A small drill having such a construction, a sectional view of the cutting portion thereof is shown in FIG. 7, will be described below as the fifth embodiment.

As shown in FIG. 7, in the small drill 60 according to the fifth embodiment, the land 19, which is the external surface excluding the chip-discharging flute 12 and the flute-shaped portion 15, includes a first margin 23, a second margin 24, and the body clearance 19a. Similar to the chip-discharging flute 12, the body clearance 19a is helically formed in the direction opposite to the rotating direction T from the tip end toward the other end. The first margin 23 is formed in a region directly behind the chip-discharging flute 12, and the body clearance 19a is formed in a region directly behind the first margin 23. In addition, the second margin 24 is formed in a region directly behind the body clearance 19a.

The effects obtained by the first to the fourth embodiment may also be obtained by the small drill 60 of the fifth embodiment. In the case of forming a hole in a work material, both the first and the second margins 23 and 24 contact the inner wall of the hole which is being formed, and receive forces in the direction toward the rotational axis O. Accordingly, the first margin 23, which is in a region directly behind the cutting edge 17, receives a stress which serves to counterbalance the force which is applied to the cutting edge 17 so as to pull the cutting edge 17. In addition, the forces applied to the first margin 23 and to the second margin 24 also serve to counterbalance each other. Accordingly, bending of the small drill is prevented and the ability of the small drill to advance straightly is further stabilized, so that the positional accuracy of the formed hole is increased.

Although the margin 18 is separated into two parts in the above-described fifth embodiment, the margin 18 may also be separated into three or more parts.

Figure 8:
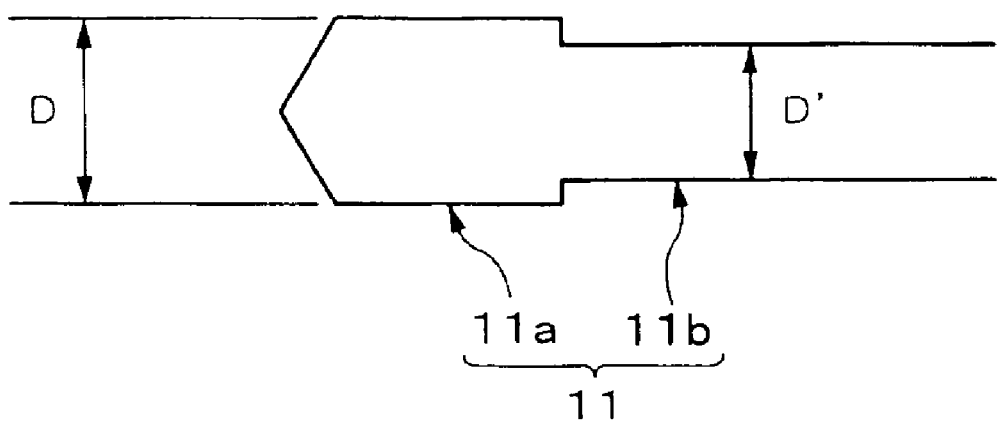
FIG. 8 is a schematic side view of a cutting portion of a small drill according to a modification of the embodiments of the present invention.
Figure 10:
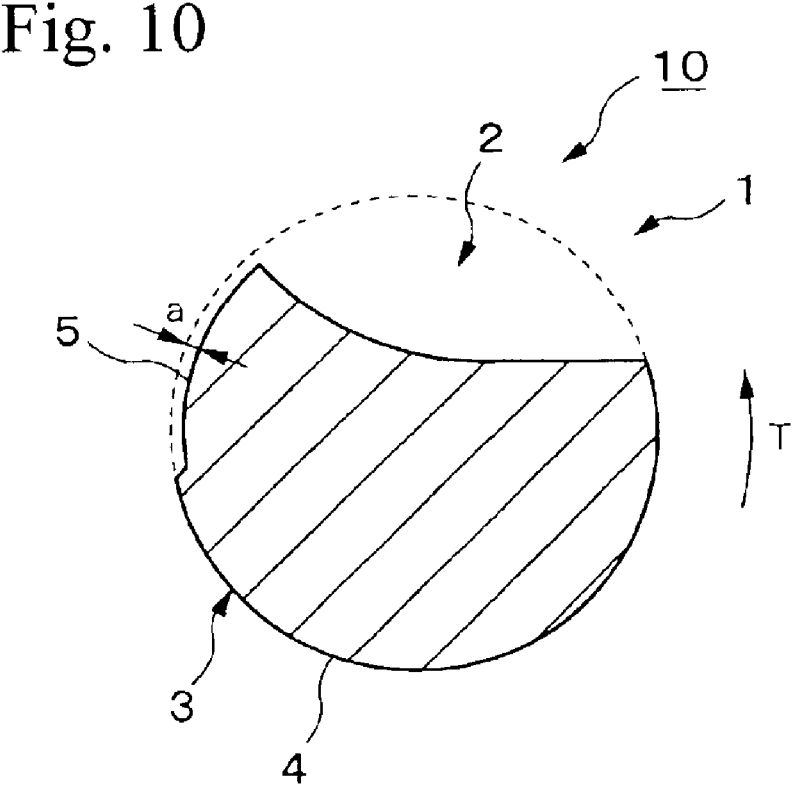
FIG. 10 is a sectional view of a cutting portion of the small drill shown in FIG. 9.
Figure 9:
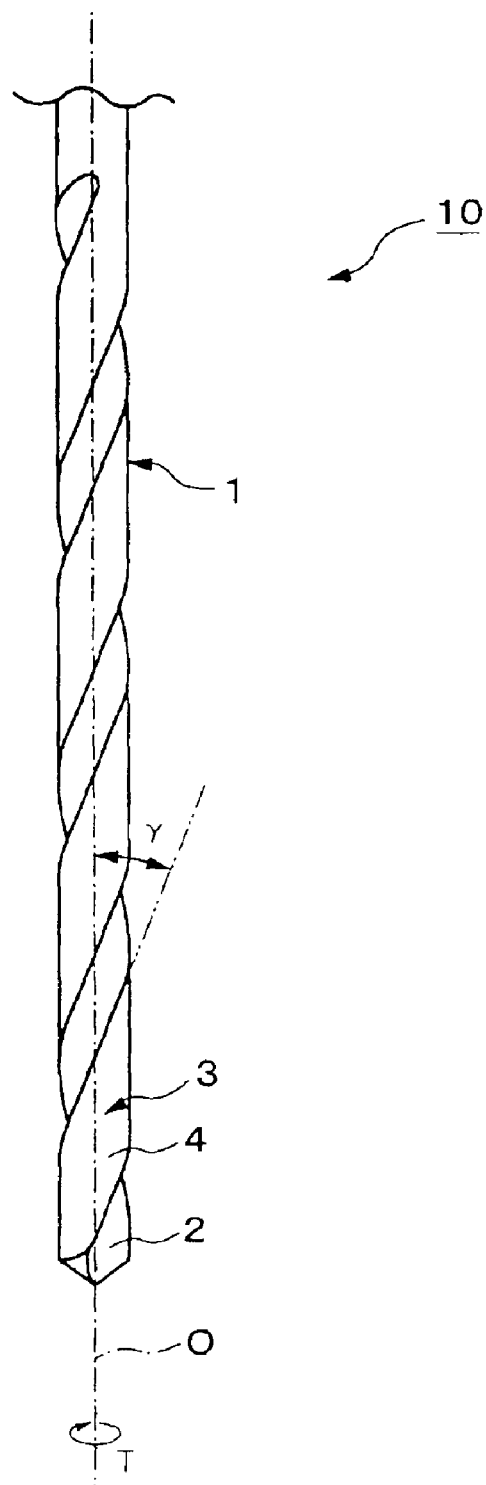
FIG. 9 is a side view of a conventional small drill.

In addition, although the small drills according to the above-described embodiments are straight types, in which the outer diameter D (maximum outer diameter D) is constant from the tip end to the other end of the cutting portion 11, the present invention is not limited to this. The present invention may also be applied to an undercut-type small drill having a cutting portion which is constructed as shown by a schematic view of a cutting portion in FIG. 8. With reference to FIG. 8, the cutting portion 11 includes a first cutting portion 11a and a second cutting portion 11b. The second cutting portion 11b has a relatively small outer diameter D' compared to the outer diameter D of the first cutting portion 11a. In such a case, the outer diameter D of the first cutting portion 11a is the maximum outer diameter D, and the margin 18 is formed on the exterior surface of the first cutting portion 11a.

In addition, although the small drills according to the above-described embodiments are straight types, in which the outer diameter D is constant from the tip end to the other end of the cutting portion 11, the present invention is not limited to this. The present invention may also be applied to back-taper-type small drills, in which the outer diameter of the cutting portion 11 decreases from the tip end toward the other end. In such a case, the outer diameter at the tip end of the first cutting portion 11a is the maximum outer diameter D.

In addition, although the cross section of the flute-shaped portion 15 has the shape of an arc concave toward the rotational axis according to each of the above-described embodiments, the present invention is also not limited to this. The flute-shaped portion 15 may also have, for example, an angular-shaped cross section.

In addition, although the core diameter ratio d/D is constant from the tip end to the other end of the cutting portion 11 according to each of the above-described embodiments, the present invention is also not limited to this. The core diameter ratio d/D may also be continuously increased from the tip end toward the other end.

In addition, although the helix angles of the chip-discharging flute 12 and of the flute-shaped portion 15 are constant from the tip end to the other end of the cutting portion 11 according to each of the above-described embodiments, the present invention is also not limited to this. The helix angles may also be continuously increased from the tip end toward the other end.

Test Results

Hole forming tests were performed using examples 1 to 5 of the present invention, comparative examples 1 and 2, and conventional examples 1 to 4. The comparative example 1 had a smaller core diameter ratio d/D than the range according to the present invention, and the comparative example 2 had a smaller margin angle θ than the range according to the present invention. With respect to the conventional examples 1 to 4, the conventional example 1 had two chip-discharging flutes 12 in the cutting portion 11, and the conventional examples 2 to 4 had only one chip-discharging flute 12 in the cutting portion 11, but did not have the flute-shaped portion 15. Helix angles of the chip-discharging flutes 12 of the examples 1 to 5, of the comparative examples 1 and 2, and of the conventional examples 1 were 40°. In addition, helix angles of chip-discharging flutes 12 of the conventional examples 2 to 4 were 30° at the tip end of the cutting portion 11, and were continuously increased to 60° toward the other end. The test conditions and results are shown in Table 1.

TABLE 1

| | Core diameter ratio d/D (%) | Margin angle θ (°) | Tool life |
|---|---|---|---|
| Comparative example 1 | 55 | 130 | 4300 |
| Comparative example 2 | 65 | 90 | 4100 |
| Example 1 | 60 | 120 | 6200 |
| Example 2 | 60 | 150 | 6500 |
| Example 3 | 65 | 150 | 6700 |
| Example 4 | 65 | 180 | 6800 |
| Example 5 | 70 | 240 | 7100 |
| Conventional example 1 | — | — | 1400 |
| Conventional example 2 | 60 | 60 | 3800 |
| Conventional example 3 | 70 | 120 | 2800 |
| Conventional example 4 | 80 | 180 | 1800 |

Each of the small drills of the examples of the present invention, the comparative examples, and the conventional examples was of the straight type, in which the outer diameter was 0.1 mm from the tip end to the other end of the cutting portion 11. In addition, the effective cutting length L of the cutting portion 11 of each of the examples of the present invention, the comparative examples, and the conventional examples was 1.2 mm. A stack of four double-sided BT resin plates, each of which was 0.2 mm in thickness, was prepared as a work material, and a covering plate (0.2 mm thick LE400) and a bottom plate (1.6 mm thick bakelite resin) were applied thereon during the hole forming process. Holes were formed in units of one hundred under the following conditions: rotational speed 160000 rpm, feed speed 0.015 mm/rev., and step feed was not applied. Then, the holes which were formed under a condition that the average of the positional accuracies of one hundred holes was within ±50 μm were counted. In Table 1, the numerals described in the "tool life" column indicate the numbers of holes which were formed before the average of the positional accuracies of one hundred holes exceeded ±50 μm.

As shown in Table 1, with respect to the examples 1 to 5, the core diameter ratios d/D, in percent, were 60% or more, and the margin angles were 120° or more. When the examples 1 to 5 were used, 6200 or more holes were formed with stable positional accuracy. In addition, especially when the examples 3 to 5, in which the core diameter ratios d/D, in percent, were 65% or more and the margin angles were 150° or more, were used, excellent results were obtained, in which 6700 or more holes were formed with stable positional accuracy.

With respect to the comparative example 1, in which the core diameter ratio d/D, in percent, was 55% and was lower than the range according to the present invention, the rigidity of the drill was reduced due to such a small core diameter. Thus, the straightness of the holes was degraded, and only 4300 holes were formed with stable positional accuracy. In addition, with respect to the comparative example 2, in which the margin angle θ was 90° and was lower than the range according to the present invention, the contact area between the margin and the inner wall of the hole was not sufficient. Accordingly, the ability of the small drill to advance straightly was degraded, and only 4100 holes were formed with stable positional accuracy.

In addition, with respect to the conventional example 1, in which two chip-discharging flutes 12 were formed in the cutting portion 11, the core diameter was especially small so that the rigidity was reduced. Thus, only 1400 holes were formed with stable positional accuracy. With respect to the conventional example 2, in which one chip-discharging flute 12 was provided but the flute-shaped portion 15 was not provided in the cutting portion 11, chip dischargeability was degraded, and clumping of the chips occurred. Thus, only 3800 holes were formed with stable positional accuracy. Similarly, when the comparative examples 3 and 4, in which one chip-discharging flute 12 was provided but the flute-shaped portion 15 was not provided in the cutting portion 11, were used, chip dischargeability was also degraded and clumping of the chips also occurred. As a result, the conventional examples 3 and 4 broke at the cutting portions 11 after forming 2800 and 1800 holes, respectively.

Accordingly, when the examples 1 to 5, in which the core diameter ratio d/D, in percent, was 60% or more and the margin angle θ was 120° or more, were used, a large number of holes were formed with stable positional accuracy compared to the comparative examples 1 and 2 and the conventional examples 1 to 4. With respect to the comparative examples 1 and 2, the core diameter ratio d/D and the margin angle θ, respectively, were small compared to the range according to the present invention. With respect to the conventional examples 1 to 4, the conventional example I had two chip-discharging flutes 12, and the conventional examples 2 to 4 had only one chip-discharging flute 12, but did not have the flute-shaped portion 15.

INDUSTRIAL APPLICABILITY

The present invention relates to a cutting tool, such as a small drill, which is primarily used for forming deep, small-diameter holes in printed circuit boards.

According to the small drill of the present invention, since only one chip-discharging flute is formed in the cutting portion, the core diameter thereof is made relatively large, and the rigidity of the small drill is ensured, and thus holes may be formed with stable positional accuracy. In addition, since the flute-shaped portion, which has sufficient space for discharging chips, is formed in the front region of the chip-discharging flute in the rotating direction, the produced chips may be discharged not only through the chip-discharging flute but also through the flute-shaped portion. Accordingly, chip dischargeability is improved, and clumping of the chips and the breakage of the small drill at the cutting portion thereof may be prevented.

In addition, since the core diameter ratio d/D, in percent, is preferably set to 60% or more, the core diameter of the small drill may be sufficiently ensured, and the rigidity of the drill may be maintained to be high.

Moreover, since the margin angle is preferably set to 120° or more, a force applied to the cutting edge radially and outwardly may be counterbalanced, and the ability of the small drill to advance straightly may be improved by guiding the cutting portion thereof. Accordingly, sufficient ability of the small drill to advance straightly and positional accuracies of the formed holes may be preferably obtained.

What is claimed is:

1. A small drill used for drilling a deep, small-diameter hole having a diameter of 1 mm or less and a ratio of depth to diameter of 5 or more, said small drill comprising:
   one chip-discharging flute which is helically formed in the exterior surface of a cutting portion of said small drill around the rotational axis from the tip end toward the other end; and
   a flute-shaped portion which is formed at the front region of said chip-discharging flute in the rotating direction, which is connected to said chip-discharging flute, which is open at the exterior surface of said cutting portion, and which has a sufficient space for discharging chips which are produced during a cutting process of a work material.

2. A small drill according to claim 1, wherein the ratio of the diameter "d" of the largest circle which is inscribed in a cross section of said cutting portion to the outer diameter D of said cutting portion, that is, d/D, in percent, is 60% or more.

3. A small drill according to claim 1, wherein, in a cross section of a part of said cutting portion in which a margin is formed, an angle between a line which passes through an end of the margin and the rotational axis and a line which passes through the other end of the margin and the rotational axis is 120° or more.

4. A small drill according to claim 2, wherein, in a cross section of a part of said cutting portion in which a margin is formed, an angle between a line which passes through an end of the margin and the rotational axis and a line which passes through the other end of the margin and the rotational axis is 120° or more.

* * * * *